No. 868,340. PATENTED OCT. 15, 1907.
G. S. HERRICK & W. H. MEANEY.
WILLOW STRIPPER.
APPLICATION FILED MAR. 23, 1907.

WITNESSES:
Chas H Hughes
J. J. Laass

INVENTORS:
George S. Herrick
William H. Meaney
By E. Laass
ATTORNEY.

THE NORRIS PETERS CO., WASHINGTON, D. C.

UNITED STATES PATENT OFFICE.

GEORGE S. HERRICK AND WILLIAM H. MEANEY, OF SYRACUSE, NEW YORK, ASSIGNORS OF ONE-THIRD TO CHARLES J. HERRICK, OF SYRACUSE, NEW YORK.

WILLOW-STRIPPER.

No. 868,340.   Specification of Letters Patent.   Patented Oct. 15, 1907.

Application filed March 23, 1907. Serial No. 364,191.

*To all whom it may concern:*

Be it known that we, GEORGE S. HERRICK and WILLIAM H. MEANEY, citizens of the United States, and residents of Syracuse, in the county of Onondaga, in the State of New York, have invented new and useful Improvements in Willow-Strippers, of which the following, taken in connection with the accompanying drawings, is a full, clear, and exact description.

This invention relates to the class of machines which are designed to strip the bark from willows to be woven into baskets. And the invention consists in an improved organization of a machine which embodies novel mechanisms coöperating to strip willows very expeditiously and effectually without danger of marring or cutting the bared surface of the willow, as hereinafter set forth.

Figure 1:
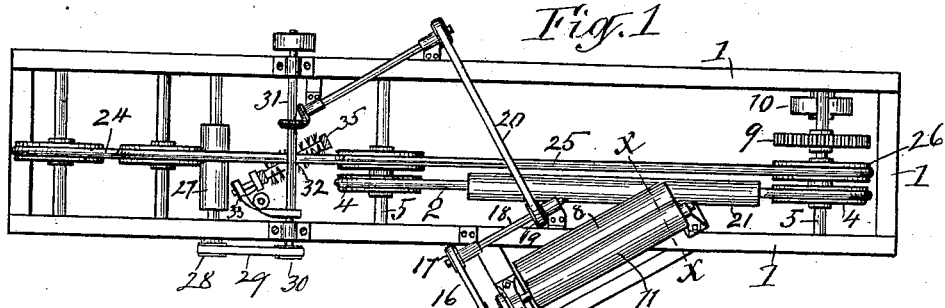
Figure 2:
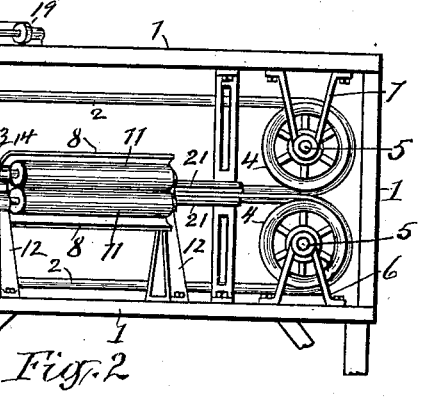
Figure 3:
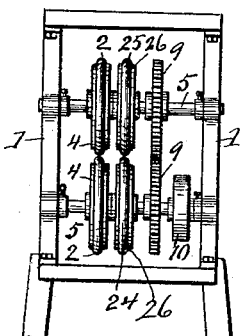
Figure 4:
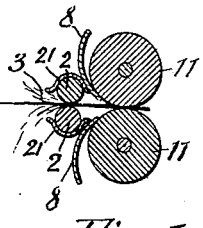

In the accompanying drawings Figure 1 is a plan view of a machine embodying the invention; Fig. 2 is a side elevation of the same; Fig. 3 is a front end elevation; Fig. 4 is an enlarged rear end view of the willow-discharge rollers; and Fig. 5 is an enlarged transverse section on the line —X—X— in Fig. 1.

Figure 5:
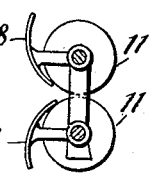

—1— represents the supporting-frame of the machine, which frame may be of any suitable shape. —2—2— denote the stripping-belt or analogous carriers disposed to receive transversely between them the willow to be stripped as indicated by the line —3— in Fig. 5. We preferably form the said carriers of endless belts of rubber shaped round in cross-section as shown. These belts are in the same vertical plane and bear with the lower portion of the upper belt upon the upper portion of the lower belt. Said belts run on grooved pulleys —4—4— fastened to transverse shafts —5—5— mounted in suitable bearings on standards —6—6— and hangers —7—7— which are attached respectively to the bottom and top rails of the frame —1—.

—21—21— are concave plates extending lengthwise of the belts —2—2— and bearing respectively on the bottom of the lower belt and on the top of the upper belt for the purpose of sustaining said belts in pinching contact with the willow passing between them. The belts are propelled in corresponding directions by means of intermeshing gears —9—9— rigidly attached to the two shafts —5—5— at the front end of the machine, one of which shafts has attached to it the driving-pulley —10— which receives motion by means of a belt connected to another pulley driven by a suitable source of power not necessary to be herein shown.

—11—11— represent two rollers disposed parallel and directly one over the other and extending obliquely from the side of the belts —2—2—. These rollers are employed to receive between them the butt or thick end of the willow —3— protruding from between the belts —2—2— as shown in Fig. 5 of the drawings. The shafts of the rollers —11—11— are journaled in bearings on pedestals —12—12— and have attached to them either pulleys —13—13— connected by a cross-belt —14— as shown, or intermeshing gears for the purpose of causing the rollers to turn with their adjacent sides from each other and to draw the willow out from between the belts —2—2— by which operation the said belts are caused to strip the bark from the willow. Any suitable driving-devices may be employed to impart rotary motion to the rollers —11—11—.

The driving-devices shown in the accompanying drawings consist of a pulley —15— attached to the shaft of one of the rollers and connected by a belt —16— with a pulley —17— on a counter shaft —18— to which is attached another pulley —19— which is driven by a belt —20— from any suitable source, not necessary to be specifically referred to.

—8—8— denote guides for leading the willow into the bite of the rollers —11—11—. Said guides consist of concave-convex plates extending lengthwise of the sides of the rollers facing the belts —2—2— and disposed with their concave sides toward said rollers as shown in Figs. 4 and 5 of the drawings.

—24—25— denote feed-belts which extend along one side of the aforesaid stripping belts —2—2— and parallel therewith. Said feed belts extend rearward beyond the main or stripping belts —2—2— to allow the operator to place the butt or large end of the willow upon the belt —24— from whence the said feed belts carry the willow to the stripping belts —2—2—. The pulleys —26— which carry the feed belts at the front end of the machine, are of the same diameter as the pulleys —4—4— and are fastened to the same shafts —5—5— and thus the feed-belts —24— and —25— are caused to travel in unison with the stripping-belts —2—2—.

—27—27— represent two parallel rollers disposed one directly over the other crosswise of the feed-belts and receiving the same between them. These rollers are employed to crack the bark and loosen it on the butt end of the willow in passing between said rollers. We do not however limit ourselves specifically to said means for loosening the bark preliminarily to stripping the willow by means of the belts —2—2— as hereinbefore stated, inasmuch as other suitable devices may be employed for that purpose. The rollers receive rotary motion by means of a pulley —28— attached to the shaft of one of the rollers and connected by a belt —29— with a pulley —30— on a shaft —31— which may receive motion by any suitable means from a motor, (not shown).

In order to remove the loosened portion of the bark from the end portion of the willow so as to allow the bared portion of the willow to enter between the stripping-belts —2—2— preparatory to complete the stripping of the entire willow, we employ two parallel rotary brushes —32— between which pass the feed-belts and willow riding thereon. The brushes are rotated reverse from each other by means of a cross-belt —33— or by gears if desired fastened to the shafts of said rollers. The lower brush is journaled in bearings on a standard —34— and the upper brush is journaled in a similar manner on a hanger —35— as shown in Fig. 2 of the drawings.

In the operation of the machine, viewed as represented in Figs. 1 and 2 of the drawings, the feed-belt —24— and stripping-belts —2—2— run toward the right-hand end of the machine. The willows to be stripped are fed to the machine from the rear of the side shown in Fig. 2. They are fed one at a time by an attendant of the machine, who presents the willow at right angles to the belts and places the butt-end of the willow onto the feed-belt —24— at the left-hand end of the machine and allows said end of the willow to pass between the feed-belts —24— and overlying portion of the belt —25—, which belts carry the willow along with them and cause the willow to pass between the rollers —27— which squeeze the introduced end of the willow sufficiently to crack the bark and loosen it on said portion of the willow, which thence passes between the brushes —32— by means of which the loosened portions of the bark are removed from the butt-end of the willow. The willow thence passes to the stripping-belts —2—2— between which the bared butt-end of the willow enters. Said end of the willow projects from the stripping-belts sufficiently to allow it to be gripped between the rotating rollers —11—11— which draw the willow out from the stripping-belts —2—2— pressing in the meantime on the willow and carrying it toward the front end of the machine. This action of the stripping-belts, during the aforesaid withdrawal of the willow, causes the bark to be stripped from the entire length of the willow.

What we claim as our invention is:—

1. A willow-stripping machine comprising parallel longitudinally traveling belts disposed to receive the willow transversely between them, means for pressing said belts into pinching contact with said willow, and means for withdrawing the willow endwise from the belts at the pinching position thereof.

2. A willow-stripping machine comprising carriers disposed to receive the willow transversely between them, means for sustaining said carriers in pinching contact with the willow, and means disposed at the side of said carriers for withdrawing the willow endwise from between said carriers.

3. A willow-stripping machine comprising parallel belts disposed to receive the willow transversely between them, means for sustaining said belts in pinching contact with the willow, means for propelling said belts in corresponding directions, and means for drawing said willow longitudinally from between the belts.

4. A willow-stripping machine comprising parallel belts shaped round in cross-section and disposed one directly over the other to receive the willow transversely between them, concave bars bearing longitudinally on said belts and sustaining them in pinching contact with the willow, rollers disposed in proximity to the belts to receive the willow therefrom, and means for rotating said rollers to draw the willow longitudinally from the belts.

5. The combination of parallel belts disposed to receive a willow transversely between them, bars bearing longitudinally on said belts and sustaining them in pinching contact with the willow, elongated parallel rollers extending at acute angles from one side of the belts and adapted to receive between them the willow, and means for rotating said rollers to draw the willow from between the belts.

6. A willow-stripping machine comprising parallel stripping belts disposed to receive a willow transversely between them, bars bearing longitudinally on said belts and sustaining them in pinching contact with the willow, and means for cracking and loosening the bark on the willow preliminary to its passage to the aforesaid stripping belts.

7. The combination, with mechanisms for stripping the bark from the willow, of means for loosening the bark on one end of the willow preliminary to its passage to the stripping mechanism, brushes interposed between the aforesaid loosening means and stripping mechanisms and brushing the loosened portion of the bark from the willow.

8. The combination with mechanism for stripping the bark from the willow, of rollers disposed one directly over the other to receive one end of the willow between them and loosen the bark on the introduced end of the willow, brushes disposed one over the other and obliquely across the path of the willow to the stripping mechanism, and means for revolving the brushes in opposite directions from each other as and for the purpose set forth.

9. A willow-stripping machine consisting of parallel endless main belts disposed in the same plane and directly one over the other to receive the willow transversely between the adjacent portions of said belts, bars bearing longitudinally on said adjacent portions of the belts, means for propelling said belts in unison, feed-belts at one side of the endless belts and parallel therewith, and extending beyond the same, rotary rollers receiving between them the extension of the feed-belt and adapted to loosen the bark on the end of the willow introduced between said rollers, brushes receiving the feed-belt between them and disposed obliquely across the same, means for revolving said brushes in reversed directions, parallel rollers extending obliquely from the side of the main belts and adapted to receive between them the willow from said belts, and means for rotating said rollers as set forth and shown.

GEORGE S. HERRICK.
WILLIAM H. MEANEY.

Witnesses:
J. J. LAASS,
S. R. LAVENE.